United States Patent Office 3,666,646
Patented May 30, 1972

3,666,646
REDUCTION OF MOLECULAR WEIGHT IN POLYNUCLEOTIDES USING ULTRASONIC RADIATION
George P. Lampson, Hatfield, Alfred A. Tytell, Lansdale, Arthur K. Field, North Wales, and Maurice R. Hilleman, Lafayette Hill, Pa., assignors to Merck & Co., Inc., Rahway, N.J.
No Drawing. Filed May 15, 1970, Ser. No. 37,896
Int. Cl. B01j *1/10, 1/12*
U.S. Cl. 204—160.1
3 Claims

ABSTRACT OF THE DISCLOSURE

The invention disclosed herein relates to novel multistranded polynucleotide complexes having interferon-inducing activity and with pharmaceutical compositions thereof; with processes for preparing said complexes; and with methods for stimulating the production of interferon in living animal cells utilizing such complexes and compositions. More particularly, it relates to double-stranded complexes of polyriboinosinic acid and polyribocytidylic acid ($rI_n:rC_n$), in which the average molecular size of the polyribocytidylic acid components of the complex is substantially less than that of the polyriboinosinic acid components, and which are produced (a) by controlled synthesis of the individual homopolynucleotides, (b) by controlled depolymerization of either homopolynucleotides or polynucleotide complexes by exposing them to sonic radiation; or (c) by controlled depolymerization of the homopolynucleotide polyribocytidylic acid, by exposing it to ribonuclease degradation; such $rI_n:rC_n$ complexes possess maximal interferon-producing activity with minimal toxicity.

---

This invention relates to novel multistranded polynucleotide complexes which will induce living cells to produce interferon, and with pharmaceutical compositions containing such complexes. More particularly, it relates to double-stranded complexes of polyriboinosinic acid and polyribocytidylic acid ($rI_n:rC_n$), in which the average molecular size of the polyribocytidylic acid components of the complex is substantially less than that of the polyriboinosinic acid components; with processes for producing these novel $rI_n:rC_n$ complexes; and with methods comprising administering these novel $rI_n:rC_n$ complexes to living animal cells, thereby stimulating the production of interferon in such cells and increasing resistance of said cells to viral infection. These $rI_n:rC_n$ complexes possess maximal interferon-producing activity with substantially reduced toxicity.

Interferons are polypeptides of relatively low molecular weight which are produced by living animal cells, which production is stimulated by viruses and, as earlier discovered by us, by exposure to multistranded polynucleotides. The interferons protect uninfected cells from viral infection for prolonged periods of time when given prior to infection. They are broad-spectrum with respect to virus species, but are relatively host species-specific.

The $rI_n:rC_n$ complexes of this invention can be used as inducers for interferon production, either in vivo or in vitro. The principal use is for administration, either intranasally or by injection, to a host animal or human so that interferon is produced in vivo in substantial quantities, whereby it serves to protect the host against infection by a variety of viruses. It is also valuable for production of interferon in cell cultures of living animal or human cells; the interferon so produced may be used for administration to the corresponding species to increase resistance to virus infection.

In accordance with the present invention $rI_n:rC_n$ complexes, in which the average molecular weights of the components has been substantially reduced, have been found to possess high activity as inducers of interferon, and at the same time reduced toxicity. Such lower molecular weight $rI_n:rC_n$ complexes are produced directly from untreated complex by subjecting it to sonic radiation. Such treatment is conveniently carried out by exposing a solution of the $rI_n:rC_n$ complex, having a concentration of approximately 1 mg./ml., to the sonic radiation produced by a generator equipped with a ¾ inch probe and having a 210 watt output. The sonic radiation is ordinarily carried out with cooling, and for various periods of time depending on the degree of depolymerization which it is desired to achieve. Sonication times from approximately 30 seconds up to about 16 minutes are ordinarily sufficient when utilizing a sonic generator of the power output noted hereinabove.

Examination of $rI_n:rC_n$ solutions thus exposed to sonic radiation indicate that increasing time periods result in approximately exponential decrease in relative viscosity. Sonication for periods up to 16 minutes caused only a slight diminution in the capacity of the degraded $rI_n:rC_n$ complex to induce interferon in rabbits, although the capacity to induce resistance to VSV virus in cell culture, and to PMV infection in mice, is somewhat reduced.

In accordance with a further embodiment of this invention, $rI_n:rC_n$ complexes are prepared in which the individual $rI_n$ and $rC_n$ components are of reduced average molecular weight. These lower molecular weight homopolymers are conveniently prepared by controlled enzymatic polymerization of inosine diphosphate and cytidine diphosphate using polynucleotide-phosphorylase (PNPase) as the enzymatic catalyst. Alternatively, $rC_n$ homopolymers of relatively low average molecular weight can be produced by degradation of high molecular weight $rC_n$ by means of sonic radiation as hereinabove described. High molecular weight $rC_n$ homopolymer is also conveniently degraded by treatment with ribonuclease, preferably pancreatic ribonuclease-A; thus, $rC_n$ homopolymer having an average molecular weight of approximately $1.9 \times 10^5$, and relative viscosity 4.1 (water=1.0), is degraded to partially depolymerized $rC_n$ having relative viscosity of about 1.08 by 30 minutes digestion with ribonuclease.

The following examples illustrate methods of carrying out the present invention, but it is to be understood that these examples are given for purposes of illustration and not of limitation.

EXAMPLE 1

Polyriboninosinic acid:polyribocytidylic acid complex ($rI_n:rC_n$) is prepared as described in our copending application Ser. No. 684,936, filed Nov. 22, 1967. Solutions of this complex (approximately 200 ml. volume) having a concentration of 1 mg./ml. are exposed with cooling, for various periods of time, to sonic radiation employing a sonic generator (such as a 20,000 cycle Biosonic III) equipped with a ¾ inch probe having a 210 watt output. Each of the partially deploymerized $rI_n:rC_n$ solutions obtained after various sonification times are then characterized by relative viscosity, sedimentation coefficient, average molecular weight, thermal transition midpoint (Tm° C.), percent hyperchromicity, relative ribonuclease sensitivity, and ultraviolet absorption spectra; the values obtained* are summarized in the following table.

| Sonification time, minutes | Relative viscosity | $S_{20,w}$ | Average molecular weight | Tm ° C. | Percent hyperchromicity | Relative RNase sensitivity | $E_{1\%}$ (262 m$\mu$) |
|---|---|---|---|---|---|---|---|
| 0 | 3.9 | 21.1 | $7.8 \times 10^6$ | 63.5 | 71.2 | 100 | 140 |
| 0.5 | 2.1 | 16.9 | $4.2 \times 10^6$ | 62.5 | 70.7 | 114 | 140 |
| 1.0 | 1.7 | 13.7 | $2.3 \times 10^6$ | 62.0 | 71.7 | 115 | 139 |
| 3.0 | 1.4 | 11.1 | $1.2 \times 10^6$ | 62.5 | 67.0 | 117 | 140 |
| 4.0 | 1.3 | 9.3 | $7.4 \times 10^5$ | 61.5 | 67.0 | 129 | 139 |
| 6.0 | 1.2 | 8.5 | $5.6 \times 10^5$ | 61.0 | 62.0 | 143 | 139 |
| 12.0 | 1.1 | 7.9 | $4.6 \times 10^5$ | 60.0 | 59.0 | 147 | 143 |
| 16.0 | 1.05 | 6.7 | $2.8 \times 10^5$ | 58.5 | 49.0 | 220 | 145 |

*Relative viscosities are measured using a viscosimeter (Ostwald) having a flow time of 120 seconds with water at 25° C. Sedimentation coefficients are determined using an ultracentrifuge (Spinco Model E) equipped with a scanning ultraviolet system. Molecular weights are calculated using the following empirical equation, which relates the sedimentation coefficient directly to molecular weight: $M.W. = 1.15 \times 10^3 \times S_{20,w}$. Percent hyperchromicity is calculated as the percent increase in optical density during thermal dissociation. Tm and RNase sensitivity are measured as described in Ser. No. 684,936.

EXAMPLE 2

Each of the partially depolymerized $rI_n:rC_n$ products (relative viscosities 1.05 to 2.1), obtained by sonic radiation of $rI_n:rC_n$ complex substantially described in Example 1, is compared with untreated $rI_n:rC_n$ complex (relative viscosity 3.9) for capacity to induce interferon in rabbits; for interference with PVM viral infection in living cell cultures; and for inducing resistance to PVM virus infection in mice. The results obtained are summarized in the following table:

EXAMPLE 3

A solution of polynucleotide ($rI_n:rC_n$) complex, having a concentration of 1 mg./ml., which has been reduced by sonic radiation to a relative viscosity of approximately 1.3, is applied to a column packed with 4% beaded agarose (Sepharose B), and eluted with phosphate-saline buffer (0.006 M sodium phosphate; 0.15 M sodium chloride; pH=7), using volumes of eluant (Ve) which are in excess of the void volume ($V_o$). Nine separate fractions from this chromatography, which contain sonicated $rI_n:rC_n$ complex having average molecular weights ranging from about $6.0 \times 10^4$ to over $10^6$, are tested for capacity to induce rabbit sera interferon, and for interference with

| $rI_n:rC_n$ used | | | Interferon induction in rabbits | | Interference with PVM in cell culture, min. eff. dose $\mu$g./ml. | Protection mice against PVM | |
|---|---|---|---|---|---|---|---|
| Sonic rad., min. | Rel. vis. | Approx. M.W. | Dose, $\mu$g./ rabbit | Interferon titer [1] | | Dose, $\mu$g./ mouse[2] | Percent excess survival over untreated control |
| 0 | 3.9 | $7.8 \times 10^6$ | 5 | >840,320 | 0.002–0.004 | 4.0 | 9 |
| | | | | | | 1.0 | 80 |
| | | | 1 | 160,320 | | 0.25 | 60 |
| 0.5 | 2.1 | $4.2 \times 10^6$ | | | | 4.0 | 90 |
| | | | | | | 1.0 | 75 |
| | | | | | | 0.25 | 60 |
| 1.0 | 1.7 | $2.3 \times 10^6$ | | | | 4.0 | 47 |
| | | | | | | 1.0 | 55 |
| | | | | | | 0.25 | 20 |
| 3.0 | 1.4 | $1.2 \times 10^6$ | | | | 4.0 | 75 |
| | | | | | | 1.0 | 42 |
| | | | | | | 0.25 | 20 |
| 4.0 | 1.3 | $7.4 \times 10^5$ | | | | 4.0 | 50 |
| | | | | | | 1.0 | 45 |
| | | | | | | 0.25 | 5 |
| 12.0 | 1.1 | $4.6 \times 10^5$ | | | | 4.0 | 30 |
| | | | | | | 1.0 | 15 |
| | | | | | | 0.25 | 5 |
| 16.0 | 1.05 | $2.8 \times 10^5$ | 5 | >640,320 | 0.008 | 4.0 | 24 |
| | | | 1 | 5,80 | | 1.0 | 12 |
| | | | | | | 0.25 | 20 |
| Control | | | 0 | <5, <5 | | 0.0 | |

[1] The sera from the individual rabbits are collected two hours after administration of $rI_n:rC_n$, and is tested for interferon by the tube dilution method in primary rabbit kidney cells using vesicular stomatitis virus for challenge.

[2] Mice are pretreated with 0.3 ml. of $rI_n:rC_n$ solutions intranasally three hours prior to intranasal infection: with 30 LD$_{50}$ of PVM.

PVM viral infection in primary rabbit kidney cell cultures. The results are summarized in the following table:

| Fraction | Estimated M.W. | Dose per rabbit, μg. | Rabbit sera Interferon titer | Interference with PVM in cell cultures [1] |
|---|---|---|---|---|
| 1 | >10⁶ | 2 | 80, 160 | 100 |
| 2 | 6.4×10⁵ | 2 | 640, 160 | |
| 3 | 4.4×10⁵ | 2 | 320, <5 | 200 |
| 4 | 2.8×10⁵ | 2 | 20, 80 | 100 |
| 5 | 2.0×10⁵ | 2 | 20, 20 | 100 |
| 6 | 1.2×10⁵ | 2 | <5, 160 | |
| 7 | 1.0×10⁵ | | | 50 |
| 8 | 7.0×10⁴ | 2 8 | <5, <5 | |
| 9 | 6.0×10⁴ | | | 12 5 |
| Control | | | <5, <5 | |

[1] Percent activity relative to fraction 1.

EXAMPLE 5

A solution of $rC_n$ ($S_{w,\,20}=9.2$) containing 1 mg. $rC_n$/ml. is treated with 0.01 μg./ml. of pancreatic ribonuclease for periods of time varying from 0 to 30 minutes, and the ribonuclease-degraded $rC_n$ fractions are complexed with untreated $rI_n$ ($S_{w,\,20}=9.2$) in equimolar concentration. (Addition of $rI_n$ solution immediately inhibits degradation of the $rC_n$ by ribonuclease.) The relative viscosities, ultraviolet absorption spectra, hypochromicities, and biological assays of the $rI_n$:$rC_n$ complexes are set forth in the following table:

| Time $rC_n$ treatment, minutes | Physical assay $rI_n$:$rC_n$ | | | Biological assay $rI_n$:$rC_n$ | | | |
|---|---|---|---|---|---|---|---|
| | | | | Min. prot. dose, PVM mice [1] | VSV in rabbit cell culture | | |
| | Relative viscosity | $E^{248\,m\mu}_{1\%}$ | Hypochromicity, percent | | Min. eff. dose (μg./ml.) | Rel. act., percent [2] | |
| 0 | 4.1 | 127 | 39.7 | 1 | 0.001–0.002 | | |
| 2.5 | 1.64 | 131 | 38.0 | 1 | 0.001–0.002 | 100 | |
| 5.0 | 1.44 | 136 | 35.8 | 4 | 0.001–0.002 | 100 | |
| 7.5 | 1.31 | 145 | 31.5 | 4 | 0.002–0.004 | 50 | |
| 10.5 | 1.25 | 155 | 26.7 | 4 | 0.004–0.008 | 25 | |
| 15.0 | 1.18 | 167 | 20.8 | >16 | 0.008–0.015 | 13 | |
| 20.0 | 1.12 | 179 | 15.3 | | 0.03–0.06 | 3.3 | |
| 30.0 | 1.08 | 196 | 7.1 | | 0.13–0.25 | 0.8 | |

[1] Minimum intranasal dose in μg./ml. which protects at least 40% of the treated mice against otherwise infection with 30 LD₅₀ of PVM.
[2] Compared with time 0 sample.

EXAMPLE 4

Solutions of the individual homopolynucleotide polyribocytidylic acid, $rC_n$ ($S_{w,\,20}=9.2$), are exposed to sonic radiation for periods of 5 and 15 minutes, respectively, substantially in accordance with the sonication procedure used to treat $rI_c$:$rC_n$ complex in Example 1 hereinabove. The untreated $rC_n$, and the $rC_n$ of lower average molecular weight produced by sonication, are complexed with $rI_n$ ($S_{w,\,20}=9.2$), and the relative viscosities of the resulting $rI_n$:$rC_n$ complexes; their ability to induce interferon production in rabbits; and their capacity for resistance against VSV infection in cell cultures, is set forth in the following table:

EXAMPLE 6

Various molecular sizes of the homopolymers, $rI_n$ and $rC_n$, are synthesized by controlled enzymatic polymerization of inosine diphosphate and cytidine diphosphate, respectively, utilizing polynucleotide phosphorylase as catalyst. The resulting $rI_n$ and $rC_n$ homopolymers of varying molecular weights are complexed in equimolar amount with high molecular weight $rC_n$ and $rI_n$, respectively. The capacities of the complexes thus formed to induce resistance against vesicular stomatitis virus (VSV) in primary rabbit kidney cell cultures, and to protect mice against pneumonia virus of mice (PVM), as compared with $rI_n$:$rC_n$ prepared using high molecular weight homopolymers ($S_{w,\,20}=9.2$) for both the $rI_n$ and $rC_n$, are set forth in the following tables:

| $rI_n$ component | | | $rC_n$ component | | | Relative activity* against VSV in cell culture (percent) | |
|---|---|---|---|---|---|---|---|
| $S_{w,\,20}$ | Average M.W. | Aver. No. nucleotide units | $S_{w,\,20}$ | Average M.W. | Aver. No. nucleotide units | | |
| 9.2 | 1.9×10⁵ | 550 | 9.2 | 1.9×10⁵ | 560 | 100 | Control. |
| 9.2 | 1.9×10⁵ | 550 | 4.0 | 3.7×10⁴ | 110 | 100 | |
| 9.2 | 1.9×10⁵ | 550 | 3.0 | 2.1×10⁴ | 65 | 100 | Smaller $rC_n$. |
| 9.2 | 1.9×10⁵ | 550 | | 1.7×10³ | 5 | <0.05 | |
| 6.0 | 7.8×10⁴ | 220 | 9.2 | 1.9×10⁵ | 560 | 10–50 | |
| 3.0 | 2.1×10⁴ | 60 | 9.2 | 1.9×10⁵ | 560 | 5 | Smaller $rI_n$. |
| | 1.1×10³ | 3 | 9.2 | 1.9×10⁵ | 560 | 0 | |

*Percent of activity compared with control $rI_n$:$rC_n$ in which each component had $S_{w,\,20}=9.2$.

| Sonification time minutes | Relative viscosity, $rI_n$:$rC_n$ | Induction of interferon in rabbits dose, μg./rabbit | Interferon titer | Interference with VSV in cell cultures minimal effective dose (μg./ml.) |
|---|---|---|---|---|
| 0 | 3.0 | 5 | 20,320 | 0.002–0.004 |
| | | 1 | 10,40 | |
| 5 | 1.7 | 5 | 320,640 | 0.001–002 |
| | | 1 | 5,160 | |
| 15 | 1.5 | | 320,640 | 0.002–0.004 |
| | | | 160,640 | |
| Control [1] | | 0 | <5, <5 | |

[1] No inducer.

| $rI_n$ | Sedimentation coefficient, $rC_n$ | Dose, μg./mouse | Protection of mice against PVM infection | |
|---|---|---|---|---|
| | | | Number survived, total | Excess survival, percent over control |
| 9.2 | 9.2 | 4 | 19/20 | 88.3 |
| | | 1 | 17/20 | 78.3 |
| | | 0.25 | 7/20 | 78.3 |
| 9.2 | 3.0 | 4 | 16/19 | 87.5 |
| | | 1 | 17/20 | 78.3 |
| | | 0.25 | 15/20 | 68.3 |
| 3.0 | 9.2 | 4 | 8/20 | 33.3 |
| | | 1 | 5/20 | 18.3 |
| | | 0.25 | 2/20 | 3.3 |
| 3.0 | 3.0 | 4 | 6/20 | 23.3 |
| | | 1 | 5/20 | 18.3 |
| | | 0.25 | 1/20 | 0 |
| Control | | 0 | 4/60 | |

EXAMPLE 7

To 250 ml. of a solution containing 1 mg./ml. of $rC_n$ ($S_{w, 20}=9.2$) in phosphate-saline buffer (PBS) containing 0.006 M phosphate, 0.15 M sodium chloride, and having pH 7.0, is added 0.1 ml. of a solution containing 0.25 μg. of pancreatic-ribonuclease-A. The solution is thoroughly mixed, and enzymatic digestion allowed to proceed for a period of approximately 90 minutes to give a solution of degraded $rC_n$ ($S_{w, 20}=2.5$). Approximately 250 ml. of a solution containing 1.07 mg./ml. of high molecular weight homopolymer $rI_n$ in PBS is added directly to the degraded $rC_n$ solution (containing ribonuclease enzyme), and the solution is thoroughly mixed thereby quenching the ribonuclease activity and forming the complex of $rI_n$ and degraded $rC_n$.

Two volumes of cold (−20° C.) absolute ethanol is added to the solution containing the $rI_n$:degraded $rC_n$ complex, the mixture is allowed to stand about 15 hours at −20° C., and the precipitated material is recovered by centrifugation, washed with 200 ml. ethanol, and dried to give approximately 500 mg. of $rI_n$: degraded $rC_n$ as a white fibrous mass.

The latter material (amounting to approximately 500 mg.) is dissolved in 100 ml. of PBS solution, and 0.1 ml. of 0.1 M $MgCl_2$ solution is added (final concentration 0.01 M $MgCl_2$), to give a solution containing about 5 mg./ml. of $rI_n$:$rC_n$ complex. The capacity of this complex containing the degraded $rC_n$ to protect mice against PVM infection, as compared with $rI_n$:$rC_n$ prepared using high molecular weight homopolymers for *both* the $rI_n$ and $rC_n$; and the relative toxicities of the two complexes, are set forth in the following table:

| Complex of high M.W. $rI_n$ with— | Protection of mice against PVM infection | | | Toxicity | | |
|---|---|---|---|---|---|---|
| | Total dose $rI_n$:$rC_n$ μg./mouse | Number survived treated | Survival, percent over control | Total dose, mg./mouse | Number survived treated | Approx. $LD_{50}$, mg./kilo |
| Degraded $rC_n$ | 4 | 15/20 | 70 | 2 | 20/25 | 30.4 |
| | 1 | 16/20 | 75 | 1 | 25/25 | |
| | 0.25 | 8/20 | 35 | 0.5 | 25/25 | |
| | | | | 0.25 | 25/25 | |
| High M.W. $rC_n$ | 4 | 13/20 | 60 | 0.5 | 20/25 | 4.65 |
| | 1 | 16/20 | 75 | 0.25 | 25/25 | |
| | 0.25 | 9/20 | 40 | 0.125 | 25/25 | |
| | | | | 0.063 | 25/25 | |
| Control (PBS) | 0 | 3/60 | | | | |

It will be noted that, as compared with the high M.W. $rI_n$:$rC_n$ complex, the $rI_n$:degraded $rC_n$ complex retains, undiminished, the antiviral host resistance capability against PVM in mice, but shows a significant reduction in toxicity. The $LD_{50}$ calculated from these data show a favorable advantage of about 6.5-hold for the $rI_n$:degraded $rC_n$ over the high M.W. material, whereas the activities as inducers of host resistance are approximately equal.

Various changes and modifications may be made in carrying out the present invention without departing from the spirit and scope thereof. Insofar as these changes and modifications are within the scope of the appended claims, they are to be considered as part of this invention.

What is claimed is:

1. The process which comprises subjecting a multi-stranded polyriboinosinic acid:polyribocytidylic acid ($rI_n$:$rC_n$) complex, having an average molecular weight of about 10 million, to sufficient sonic radiation to achieve a reduction of about 50% to 97% in the average molecular weight of said $rI_n$:$rC_n$ complex, such $rI_n$:$rC_n$ complex of reduced average molecular weight being characterized as possessing substantially undiminished interferon-inducing activity with reduced toxicity.

2. The process which comprises subjecting to sonic radiation, at a frequency of about 20,000 cycles for a period of up to about 16 minutes, a multi-stranded polyriboinosinic acid:polyribocytidylic complex ($rI_n$:$rC_n$) having an average molecular weight of about 10 million, thereby reducing the average molecular weight of the $rI_n$:$rC_n$ complex to about 3% to about 50% of the starting value; such $rI_n$:$rC_n$ complex of reduced average molecular weight being characterized as possessing substantially undiminished interferon-inducing activity with reduced toxicity.

3. The process which comprises subjecting to sonic radiation, at a frequency of about 20,000 cycles for a period up to about 15 minutes, a polyribocytidylic acid ($rC_n$) homopolymer having a sedimentation coefficient ($S_{w, 20}$) approximately equal to 9.2, and characterized as forming (when complexed with a polyriboinosinic acid ($rI_n$) homopolymer of $S_{w, 20}$ of about 9.2) a multi-stranded polyriboinosinic acid:polyribocytidylic acid complex ($rI_n$:$rC_n$) having relative viscosity of about 3.0, thereby forming an $rC_n$ homopolymer of reduced average molecular weight characterized as forming (when complexed with an $rI_n$ homopolymer of $S_{w, 20}$ about 9.2) an $rI_n$:$rC_n$ complex having a reduced relative viscosity from below 3.0 to about 1.5, such $rI_n$:$rC_n$ complex of reduced relative viscosity being characterized as possessing substantially undiminished interferon-inducer activity with reduced toxicity.

References Cited

UNITED STATES PATENTS 3,256,152  6/1966  Lampson _____ 424—85
3,021,269  2/1962  Miller _____ 204—159.14

JOHN C. BLEUTGE, Primary Examiner

R. B. TURER, Assistant Examiner

U.S. Cl. X.R.

424—85, 180